United States Patent [19]

Balza

[11] Patent Number: 4,906,155

[45] Date of Patent: Mar. 6, 1990

[54] DEVICE FOR FIXING AN OBJECT TO A RIGID STRUCTURE

[75] Inventor: Jean-Pierre Balza, Blagnac, France

[73] Assignee: Aerospatiale Societe Nationale Industrielle, Paris, France

[21] Appl. No.: 280,578

[22] Filed: Dec. 6, 1988

[30] Foreign Application Priority Data

Dec. 8, 1987 [FR] France .............................. 87 17056

[51] Int. Cl.⁴ ............................................. F16B 15/02
[52] U.S. Cl. .................................... 411/485; 411/456; 411/510; 411/908; 24/297
[58] Field of Search .............. 411/455, 456, 485, 510, 411/908, 508; 174/138 D; 244/117 A, 132; 24/289, 297, 326, 458, 573; 403/387

[56] References Cited

U.S. PATENT DOCUMENTS

| D. 293,880 | 1/1988 | Takahashi | 411/510 X |
|---|---|---|---|
| 2,959,259 | 11/1960 | Meyer | 24/297 X |
| 3,248,838 | 5/1966 | Stark | 52/481 |
| 4,646,383 | 3/1987 | Sugiura | 174/138 D |
| 4,669,688 | 6/1987 | Itoh et al. | 24/297 X |
| 4,696,128 | 9/1987 | Fukuhara | 24/297 X |

FOREIGN PATENT DOCUMENTS

| 3003176 | 8/1981 | Fed. Rep. of Germany | 24/458 |
|---|---|---|---|
| 1022731 | 3/1953 | France . | |
| 2195243 | 3/1974 | France . | |
| 2111579 | 7/1983 | United Kingdom | 24/289 |
| 2164383 | 3/1986 | United Kingdom . | |

OTHER PUBLICATIONS

Cathcart, Silas S., "Plastic Fasteners", *Fasteners*, vol. 10, No. 2, Industrial Fasteners Institute, 1955.

*Primary Examiner*—Rodney M. Lindsey
*Attorney, Agent, or Firm*—Pearne, Gordon, McCoy & Granger

[57] ABSTRACT

The fixing of an object such as a thermophonic insulation cushion or blanket to a structure such as as stringer within the fuselage of an aircraft is carried out by means of a one-piece device (10). The latter comprises a support member (12) resting on a circular arc-shaped portion (a3) of the stringer (a), a fixing member (14), which is fitted into a hole (a4) in the stringer and an attachment member (16), such as a serrated pin, on which the cushion is held by a washer (20).

7 Claims, 1 Drawing Sheet

DEVICE FOR FIXING AN OBJECT TO A RIGID STRUCTURE

BACKGROUND OF THE INVENTION

The invention relates to a device making it possible to fix an object to a rigid structure.

In the aeronautical industry such a device can be advantageously used for fixing a thermophonic insulation mattress, cushion or blanket to a stringer within the fuselage of an aircraft. However, this application is not limitative, the device according to the invention also being usable for fixing other objects such as electrical cables, in both the aeronautical industry and in other industries.

FIG. 1 diagrammatically represents a side view of a device presently used for fixing a thermophonic insulation cushion to a stringer within an aircraft fuselage. In FIG. 1 reference a designates a stringer fixed to the wall b of the aircraft fuselage. The cushion fixing device comprises an angle bracket c fixed to the stringer a by two rivets d and a fixing pin e fixed to the angle bracket c by a nut f. Angle bracket c is made from a bent sheet, i.e. which must be successively cut out, bent, perforated and then surface treated. The fixing of the angle bracket c to the stringer a then involves the making of two holes in the latter and then the fitting of two rivets. Finally, the fixing pin e, made from a plastics material, must be fitted on the angle bracket and then fixed to the latter by nut f.

The description of these various operations show that the realization of the known fixing device shown in FIG. 1 is relatively long. Moreover, said device has numerous parts, so that it is relatively heavy and costly.

SUMMARY OF THE INVENTION

The invention relates to a fixing device fulfilling the same functions as that described relative to FIG. 1, whilst permitting an almost instantaneous fitting and having a considerably reduced weight and cost.

The invention therefore proposes a device for fixing an object to a rigid structure, said device being characterized in that it comprises a bearing or support member able to partly encircle the rigid structure, the fixing member being fittable into a hole formed in the rigid structure, as well as an attachment member for said object, said three members being made in one piece and preferably from a plastics material.

According to a preferred embodiment of the invention, the fixing member comprises elastic lugs or tabs which can retract during the introduction of said member into the hole within the rigid structure and then expand facing a rear face of said structure to lock the device on the rigid structure by the harpoon effect. The fixing member can then also comprise at least one elastic lip, which can bear on a front face of the rigid structure, in order to elastically apply the elastic tabs to the rear face of said structure.

In a preferred application of the invention in which the rigid structure is a stringer, whereof a part has a circular arc section, the support member comprises a concave surface with an approximately circular arc section and complementary of a front face of said part of the stringer.

The support member is then preferably terminated by a hook-shaped part able to cover one terminal edge of the stringer, when said concave surface bears against the front face of said part of the stringer. When the object has a fixing hole, as is in particular the case when said object is a thermophonic insulation cushion internally covering the fuselage of an aircraft, the attachment member is preferably constituted by a serrated pin able to penetrate said fixing hole.

The serrated pin can in particular be formed by a succession of truncated cones, whose large bases are turned towards the support member and the device can also have a locking washer, which can be fitted onto the serrated pin in order to hold said object in place.

A preferred embodiment of the invention is described in greater detail hereinafter relative to the attached drawings, wherein show:

DESCRIPTION OF THE PREFERRED EMBODIMENT

Figure 2:
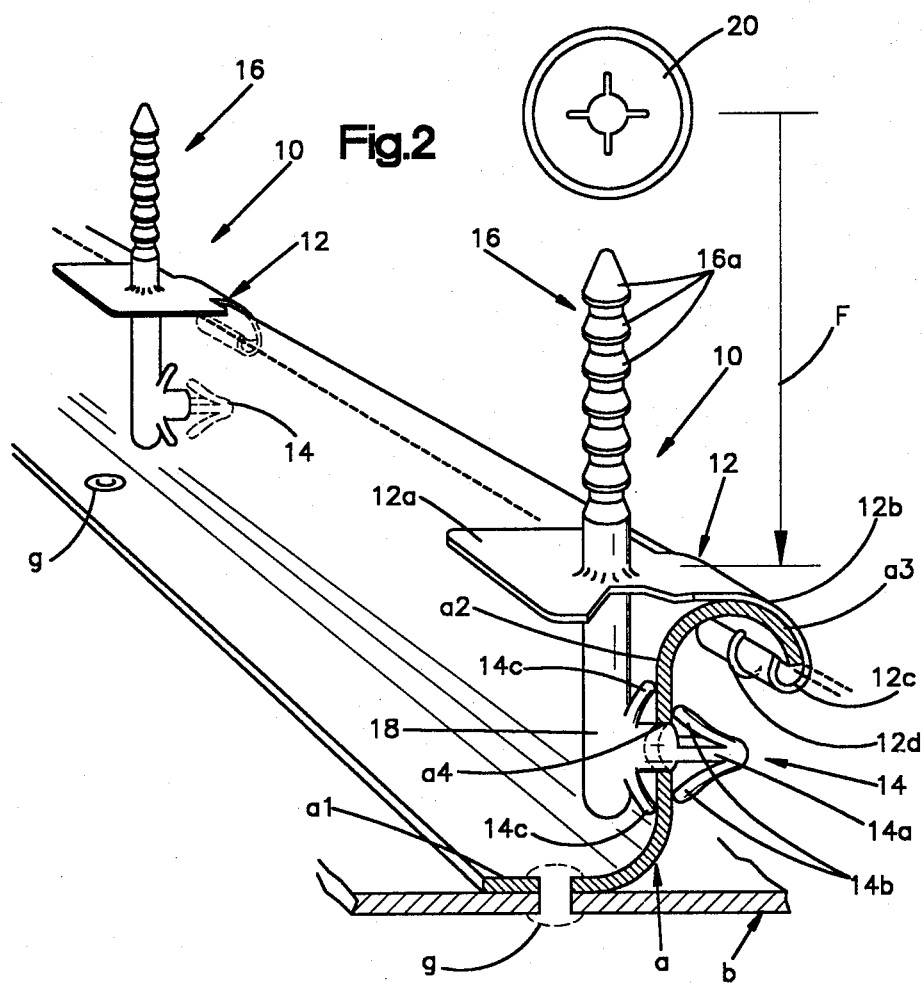
FIG. 2 a perspective view showing a device for fixing an insulation cushion to a stringer according to the invention.

In FIG. 2, reference a designates a stringer placed within an aircraft fuselage and reference b designates part of the fuselage to which said stringer is fixed. Stringer a has an approximately angle bracket-like section. One of the planar branches a1 of said angle bracket is fixed to the fuselage part b, e.g. by means of rivets g. The other angle bracket branch formed by the stringer a has a planar portion a2 oriented perpendicular to the first branch, said planar portion being extended by a curved portion a3 having approximately a semicircular cross-section. Portion a3 is curved towards portion b of the fuselage, on the side opposite to the first branch a1.

FIG. 2 also shows two fixing devices according to the invention by means of which a not shown thermophonic insulation cushion is fixed to the stringer a. Each of the fixing devices is designated overall by reference 10. According to the invention, each fixing device 10 comprises three members fulfilling separate functions, said three members being constructed in one piece and preferably from a molded plastics material.

More specifically, each fixing device 10 comprises a bearing or support member 12, a fixing member 14 and an attachment member 16. Each of them will now be described in detail with reference to FIG. 2.

Support member 12 is approximately in the form of a plate having a planar portion 12a extended by a portion 12b having an approximately circular arc section, which can bear on portion a3 of stringer a. More specifically, the internal concave surface of portion 12b of support member 12 has a shape complementary to that of the front or external convex face of stringer portion a3.

At its end, portion 12b of support member 12 is terminated by a hook-shaped portion 12c provided with a rib 12d along the median plane of device 10. Portion 12c covers the terminal edge of portion a3 of the stringer, when the portion 12b of the support member bears on the stringer portion a3. When portion 12b of support member 12 covers portion a3 of stringer a, as has been described, the planar portion 12a of member 12 is oriented approximately parallel to branch a1 of the stringer and to portion b of the fuselage. Obviously, the shape of portion 12b of the support member is dependent on the shape of the rigid structure to which the device is fixed. This means that portion 12b has a different shape from that described when the rigid structure on which the device has to be fixed has a different shape.

The fixing member 14 is mounted on the planar portion 12a of support member 12 via an e.g. cylindrical rod 18, which projects perpendicular to said portion 12a and approximately in the center thereof from the side towards which is curved portion 12b, i.e. towards fuselage portion b.

The fixing member 14, which is located at the end of rod 18 is oriented parallel to the planar portion 12a, towards portion 12b in the median plane of support member 12. Thus, when portion 12b covers the stringer portion a3, said fixing member 14 is fitted into a hole a4 formed for this purpose in stringer portion a2. Fixing member 14 comprises a central portion 14a, at least two elastic tabs 14b and one or more lips 14c.

The elastic tabs 14b are integral with the end of the central portion 14a and oriented obliquely towards rod 18. Thus, when fixing member 14 is introduced into hole a4 of the stringer, the tabs 14b give way towards the central portion 14a before elastically expanding after passing through hole a4. Their ends then face the rear or inner face of the stringer portion a2.

The elastic lip or lips 14c are fixed to the base of the central portion 14a and rapidly move away therefrom, whilst being oriented towards the end of member 14. Thus and as shown in FIG. 2, the end of each of the lips 14c bears on the front or outer face of the stringer portion a2, when the tabs 14b are located on the other side of said portion. The lip or lips 14c thus elastically hold the ends of tabs 14b in such a way that they bear against the rear face of stringer portion a2.

Finally, the attachment member 16 projects from the portion 12a of bearing member 12 from the side opposite to rod 18 and in the axial extension thereof. Attachment member 16 generally has a symmetry of revolution about its axis perpendicular to portion 12a and is constituted by a serrated pin formed by a succession of truncated cones 16a, whose large bases are turned towards portion 12a of the support member.

When the devices 10 have been fixed and positioned on stringer a by means of their support members 12 and their fixing members 14, the attachment members 16 are oriented perpendicular to the adjacent fuselage portion b. The not shown thermal insulation cushion can then be directly put into place by engaging the fixing holes formed in the cushion on each attachment member 16. The cushion is then maintained in place by fitting onto each of the serrated pins constituting the attachment members 16 a locking washer 20, which is automatically locked onto the serrations formed on the outer surface of said pin (arrow F in FIG. 2).

Figure 1:
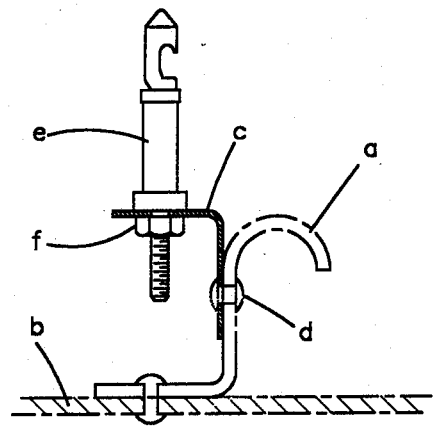
FIG. 1, already described, a side view diagrammatically showing a device for fixing an insulation cushion to a stringer according to the state of the art.

Compared with the prior art illustrated in FIG. 1, the fixing device according to the invention has a much simpler realization. Thus, the two parts 10 and 20 can easily be made by molding a plastics material. The device can then be fitted very rapidly, because it takes place in a single operation, by fitting in or nesting, following the making of a single hole a4 in the stringer. The inventive device is also much less heavy and cumbersome than the prior art device of FIG. 1.

Obviously the invention is not limited to the embodiment described and in fact covers all variants thereof. The shape of support member 12 varies as a function of the nature of the structure on which it rests. In a comparable way, attachment member 16 can have a shape different from that described, particularly when the object to be fixed is not a cushion but e.g. a bundle of electric cables. Finally, the fixing member 14 can comprise a single annular lip 14c, or several circumferentially distributed lips.

We claim:

1. Device for fixing an isolation cushion to a stringer comprising a planar portion extended by a curved portion having a substantially circular arc-shaped cross-section, wherein said device comprises:
    a support member including a concave surface having a substantially circular arc-shaped cross-section complementary to an outer face of said curved portion of the stringer, and a hookshaped portion able to surround an end edge of said curved portion;
    a fixing member carried by the support member and able to fit into a hole formed in the planar portion of the stringer, in order to lock the device on said stringer;
    an attachment member carried by the support member and comprising a serrated pin able to penetrate a fixing hole formed in the isolation cushion; and
    a locking washer able to be fitted onto the serrated pin to hold said isolation cushion in place; and wherein said support member, fixing member and attachment member are made in one single piece from a plastics material.

2. A device according to claim 1, wherein the support member comprises a planar portion extended by a curved portion on which is formed said concave surface, said curved portion of the support member being ended by said hook-shaped portion.

3. A device according to claim 2, wherein the fixing member is mounted on a rod carried on a first face of the planar portion of the support member, said fixing member being substantially parallel to the planar portion of the support member and oriented in the same direction as the curved portion of the latter.

4. A device according to claim 3, wherein the serrated pin is carried on a second face of the planar portion of the support member opposite to said first face, and is aligned with said rod.

5. A device according to claim 4, wherein the serrated pin is formed by a succession of truncated cones having the large bases thereof facing said second face of the planar portion of the support member.

6. A device according to claim 1, wherein the fixing member comprises elastic tabs able to retract during the introduction of said fixing member into the hole formed in the planar portion of the stringer and then expand, facing a rear face of this planar portion of the stringer, in order to lock the device on the stringer by a harpoon effect.

7. A device according to claim 6, wherein the fixing member also comprises at least one elastic lip, which can bear on a front face of the stringer to elastically apply the elastic tabs to the rear face of said stringer.

* * * * *